US012548725B2

(12) United States Patent
Plechinger et al.

(10) Patent No.: US 12,548,725 B2
(45) Date of Patent: Feb. 10, 2026

(54) DEVICE FOR SWITCHING A HANDLE OF AN ELECTRICAL SWITCH, AND MULTI-FUNCTION DRIVE HAVING A DEVICE OF THIS TYPE

(71) Applicant: Siemens Aktiengesellschaft, Munich (DE)

(72) Inventors: Ekkehard Plechinger, Röckersbühl (DE); Alexander Fanderl, Riedenburg (DE)

(73) Assignee: Siemens Aktiengesellschaft, Munich (DE)

(*) Notice: Subject to any disclaimer, the term of this patent is extended or adjusted under 35 U.S.C. 154(b) by 218 days.

(21) Appl. No.: 18/548,966

(22) PCT Filed: Mar. 3, 2021

(86) PCT No.: PCT/EP2021/055399

§ 371 (c)(1),
(2) Date: Sep. 5, 2023

(87) PCT Pub. No.: WO2022/184256

PCT Pub. Date: Sep. 9, 2022

(65) Prior Publication Data

US 2024/0161991 A1 May 16, 2024

(51) Int. Cl.
*H01H 71/10* (2006.01)

(52) U.S. Cl.
CPC .................................. *H01H 71/10* (2013.01)

(58) Field of Classification Search
CPC ...... H01H 71/10; H01H 71/14; H01H 71/145; H01H 37/32; H01H 37/323; H01H 61/0107; H01H 2061/0107; H01H 2061/0115
USPC .......................................................... 200/237
See application file for complete search history.

(56) References Cited

U.S. PATENT DOCUMENTS

| | | | | |
|---|---|---|---|---|
| 4,544,988 | A * | 10/1985 | Hochstein | H01H 61/0107 337/140 |
| 7,368,675 | B2 * | 5/2008 | Ishido | H01H 71/56 200/330 |
| 9,734,974 | B2 * | 8/2017 | Colombo | H01H 71/66 |
| 2014/0117859 | A1 | 5/2014 | Swatsky et al. | |
| 2020/0051423 | A1 * | 2/2020 | Kevelos | G08B 5/36 |

FOREIGN PATENT DOCUMENTS

| | | | |
|---|---|---|---|
| EP | 0801411 | A2 | 10/1997 |
| EP | 3657524 | A1 | 5/2020 |
| WO | WO 2013017595 | A1 | 2/2013 |

* cited by examiner

*Primary Examiner* — Anthony R Jimenez
(74) *Attorney, Agent, or Firm* — Laurence A. Greenberg; Werner H. Stemer; Ralph E. Locher

(57) ABSTRACT

A device for switching a handle of an electrical switch has at least a first actuator and a second actuator. When the device is installed on the electrical switch, the first actuator can move the handle in a first direction and the second actuator can move the handle in a second direction opposite the first direction. The first actuator and the second actuator are shape-memory alloy actuators.

10 Claims, 4 Drawing Sheets

DEVICE FOR SWITCHING A HANDLE OF AN ELECTRICAL SWITCH, AND MULTI-FUNCTION DRIVE HAVING A DEVICE OF THIS TYPE

FIELD AND BACKGROUND OF THE INVENTION

The invention relates to a device for switching a handle of an electrical circuit breaker and a multi-function operator having a device of this type.

The main task of current power circuit breakers is the connection or disconnection of current and voltage from one section of the installation and also the autonomous tripping of the power circuit breaker in the event of an overload or a short circuit.

Typically, in the delivery state, power circuit breakers have a toggle, also termed a handle, using which the customer can switch the power circuit breaker on or off. If the power circuit breaker has tripped in the event of overload or short circuit, the customer can reset the power circuit breaker again using the same toggle or the same handle.

The toggle or the handle describes a translational movement, that is to say is moved linearly in one direction for switching. Some customers wish to operate power circuit breakers not using a translational movement, but rather using a rotational movement. A comprehensive spectrum of rotary handle operators (RHOs) from the accessories range exists for the customer to this end. A multiplicity of accessory modules exist beyond all of the modules of power circuit breakers, for example front-operated rotary handle operators, front-operated rotary handle operators with shaft stub, door-coupling rotary handle operators or side wall operators.

Furthermore, there is a requirement to switch power circuit breakers on or off from the distance of a (remote) control room. For this reason, motor operators (MOs) and stored energy operators (SEOs) are available as accessories.

While motor operators switch a power circuit breaker on or off in a cycle of several seconds, a stored energy operator can do this in fractions of a second by means of the integrated spring energy store. After tripping, a stored energy operator requires a few seconds until it has loaded the spring energy store for the next switching operation.

Today, rotary handle operators are typically produced as complicated transmission modules, which are of tall construction and in which the customer must operate a rotary handle by applying a high amount of force. This rotational movement is converted in the rotary handle operator into a translational movement, which in turn operates the circuit breaker handle. While the customer can still achieve the movement using two fingers in the case of small power circuit breakers, they already need to use their whole hand to be able to apply an appropriate torque to the rotary handle in the case of large modules. Very large circuit breakers have rotary handle operators with a rotary handle which has a lever of an appropriate length, in order to be able to apply the required torque manually.

Motor operators are generally of even taller mechanical construction than rotary handle operators. Motor operators have an electric motor in their interior and likewise have a transmission, which converts the rotational movement of the motor into a translational movement for the circuit breaker handle. Complicated electronics with corresponding sensors, such as limit switches for example, are required to control the motor operator and the settings thereof appropriately.

Stored energy operators are of even taller mechanical construction than motor operators, as in addition to motor, transmission and electronics, stored energy operators also additionally have a spring energy store integrated for the fast switching.

When considered as a whole, motor operators and stored energy operators are, similarly to power circuit breakers, very complex modules which contain many mechanical, electromechanical and electronic components. The production costs, the manufacturing outlays and the outlays for development support are therefore correspondingly high.

SUMMARY OF THE INVENTION

The object of the invention is therefore to provide a device for switching a handle and a multi-function operator for an electrical circuit breaker, which reduces the above-described complexity and diversity of different modules and is also compact and functional with a simple mechanical and electrical construction.

This object is achieved according to the invention by the device for switching a handle of an electrical circuit breaker as claimed. Advantageous embodiments of the device according to the invention are specified in the dependent claims. Likewise, the object is achieved according to the invention by the multi-function operator as claimed. Advantageous embodiments of the multi-function operator according to the invention are specified in the dependent claims.

The device for switching a handle of an electrical circuit breaker as claimed comprises at least one first actuator and one second actuator, wherein when the device is mounted on the electrical circuit breaker, the first actuator can move the handle in a first direction and the second actuator can move the handle in a second direction, which is opposite to the first direction, and wherein the first actuator and the second actuator are shape-memory alloy actuators in each case.

It is advantageous here that a compact design of a device of this type enables much spatially smaller trip units than existing motor operators, rotary handle operators or stored energy operators for example. Also, above all, a reduction in the spectrum of rotary handle operator modules is achieved. Large reserves of force and travel can be realized in a small space.

In one embodiment of the device according to the invention, when the device is mounted on the electrical circuit breaker, the first actuator can move the handle only in a first direction and the second actuator can move the handle only in a second direction, which is opposite to the first direction.

In a further embodiment of the device according to the invention, the device comprises a carriage and when the device is mounted on the electrical circuit breaker, the carriage encloses the handle of the electrical circuit breaker and the handle is operated by the movement of the carriage, wherein the first actuator can move the carriage in a first direction and the second actuator can move the carriage in a second direction, which is opposite to the first direction.

In one embodiment, the carriage is moved along at least one guide.

The multi-function operator according to the invention as claimed in patent claim 5 comprises a housing and a device according to the invention, wherein the multi-function operator is provided by means of the housing for mounting on the electrical circuit breaker and the actuators of the device can set the handle in motion when the multi-function operator is mounted on the electrical circuit breaker.

In one embodiment of the multi-function operator, the shape-memory alloy actuators are configured such that when the multi-function operator is mounted on the electrical circuit breaker, the handle can be operated in less than 50 msec (milliseconds), preferably between 10 msec and 20 msec.

It is advantageous here that it is possible to dispense with the currently typical construction using a ratchet wheel of a motor operator or a stored energy operator by replacing this with the shape-memory alloy actuators. Additionally, a multi-function operator of this type is much quieter than a motor operator or a stored energy operator.

In a further embodiment of the multi-function operator according to the invention, this multi-function operator comprises at least one operator knob, the activation of which can set the actuators of the device in motion. This operator knob can be connected to the rest of the multi-function operator mechanically, electrically or wirelessly. It is advantageous here that the operator knob can be placed in a completely location-independent manner, for example on the switchgear cabinet door or at a different place in the installation or else in the remote control room.

In one embodiment of the multi-function operator according to the invention, the at least one operator knob is designed as a rotary handle operator knob or as a button.

In a further embodiment of the multi-function operator according to the invention, the multi-function operator is operated by means of an external appliance, which is connected to the multi-function operator mechanically, electrically or wirelessly and which can set the actuators of the device in motion. An external appliance of this type may for example be a smartphone, a tablet computer, a notebook or another computer, particularly in a remote control room.

The above-described properties, features and advantages of this invention and the manner in which they are achieved become clearer and more clearly understandable in connection with the following description of the embodiments which are explained in more detail in connection with the figures.

BRIEF DESCRIPTION OF THE FIGURES

FIGS. 1A, 1B and 10: show a conventional motor operator, a conventional rotary handle operator and a conventional side motor operator;

DETAILED DESCRIPTION OF THE INVENTION

Figure 1A:
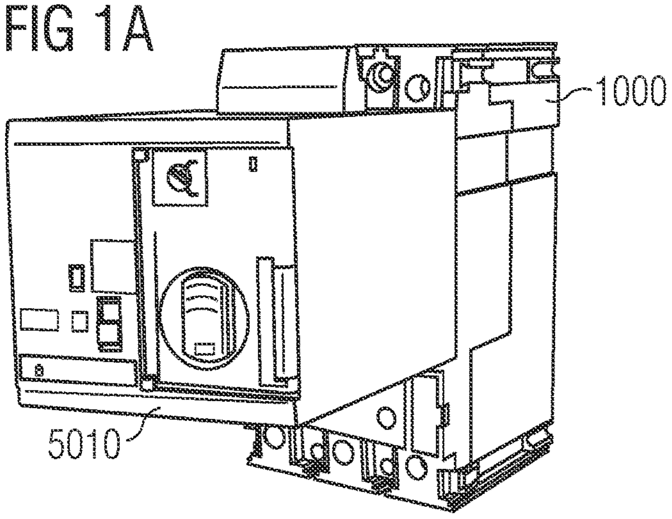

FIG. 1A depicts an electrical circuit breaker 1000, for example a power circuit breaker. A motor operator 5010 (MO), which can operate the handle of the electrical circuit breaker 1000, is placed on the electrical circuit breaker 1000. The motor operator 5010 has in its interior an electric motor and a transmission, which converts the rotational movement of the motor into a translational movement of the handle of the electrical circuit breaker 1000. The motor operator 5010 has complicated electronics with appropriate sensors, such as for example limit switches, in order to control the settings of the motor operator accordingly.

Figure 1B:
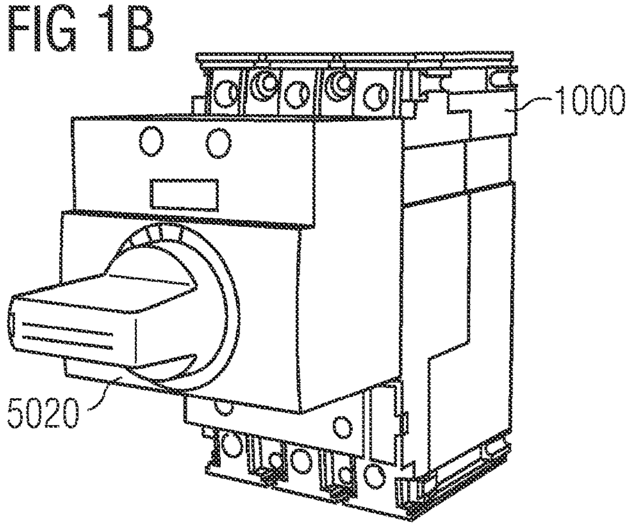
Figure 1C:
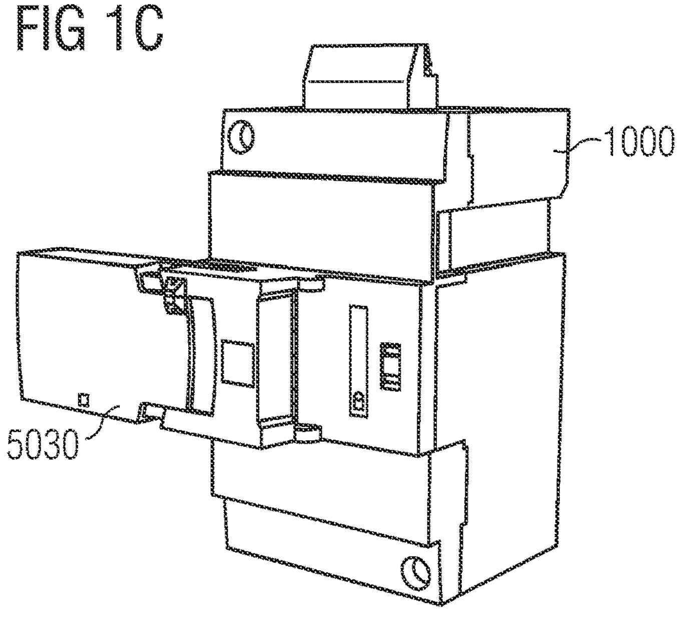

FIG. 1B shows a rotary handle operator 5020 which is placed on an electrical circuit breaker 1000. The rotary handle operator 5020 comprises a transmission module, which is of tall construction and which converts the rotational movement into a translational movement of the handle of the electrical circuit breaker 1000.

FIG. 10 illustrates a side motor operator 5030, which is mounted on the side of the electrical circuit breaker 1000 in order to prevent too tall a construction in the switchgear cabinet.

Figure 2B:
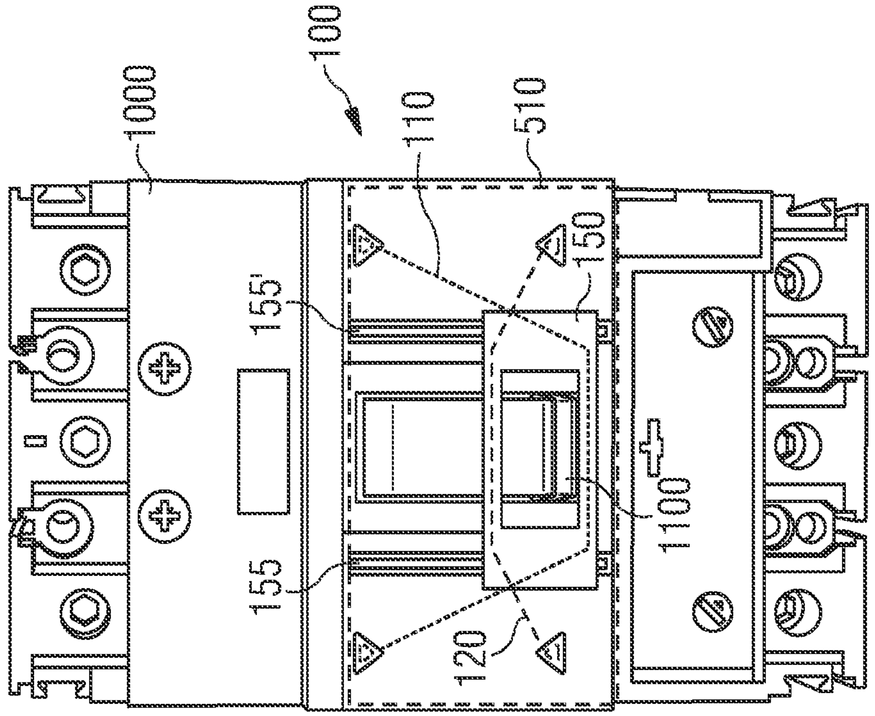
FIGS. 2A and 2B: show an electrical circuit breaker and an electrical circuit breaker with the device according to the invention for switching a handle.
Figure 2A:
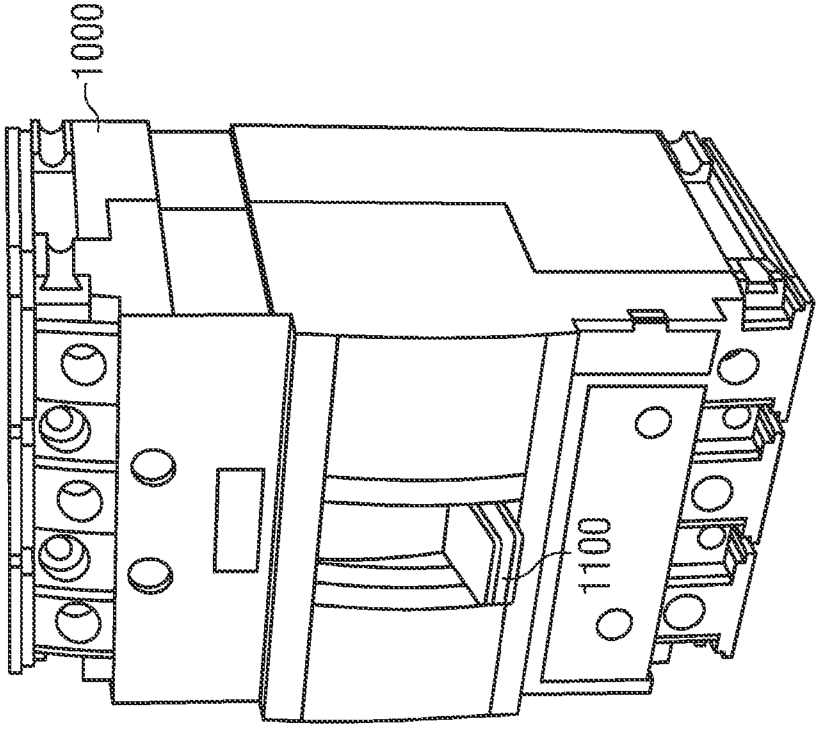

FIG. 2A illustrates an electrical circuit breaker 1000 with a handle 1100. The handle 1100 can be moved translationally between various switching states.

FIG. 2B illustrates the electrical circuit breaker 1000 with the handle 1100 and the device 100 according to the invention for switching the handle 1100 of the electrical circuit breaker 1000. The device 100 comprises a first actuator 110 and a second actuator 120, wherein when the device 100 is mounted on the electrical circuit breaker 1000, the first actuator 110 can move the handle 1100 in a first direction and the second actuator 120 can move the handle 1100 in a second direction, which is opposite to the first direction. According to the illustration of FIG. 2B, the first direction is the movement of the handle 1100 from bottom to top and the second direction is the movement of the handle 1100 from top to bottom.

The first actuator 110 and the second actuator 120 are shape-memory alloy actuators in each case. Shape-memory alloys have the property that at a certain, higher temperature they can remember their original shape. As a result, it is possible to construct shape-memory alloy actuators which are forced into a different position or length at a low temperature. If one heats these actuators to this certain higher temperature which is set by the alloy proportions, then these actuators suddenly regain their memorized shape. The heating of the shape-memory alloys can take place via the environment by means of a heating element, which means indirect heating or by current flowing through the shape-memory alloy itself, which corresponds to direct heating.

Shape-memory alloy actuators can be designed as a wire, which contracts at the higher temperature, as a metal strip, which bends at the higher temperature, as a cuboid, which changes its volume at the higher temperature, or as any desired shaped geometry, which fits optimally into the available space and which changes its extent or its volume in a certain desired direction at the higher temperature.

Thus, if one applies current at the first actuator 110 for direct heating, then the handle 1100 is transferred from its lower position, for example the OFF position, to the upper position, for example the ON position. If the second actuator 120 is then supplied with current, the handle 1100 is transferred from the upper position, for example the ON position, to the lower position, for example the OFF position. The device 100 according to the invention is of very low construction in terms of its design and can therefore be integrated very flat into a housing 510.

Depending on the design of the first actuator 110 and the second actuator 120, it may be provided that the first actuator 110 can move the handle 1100 only in a first direction and the second actuator 120 can move the handle 1100 only in a second direction, which is opposite to the first direction.

In the case of the device 100, FIG. 2B further illustrates a carriage 150, which encloses the handle 1100 of the electrical circuit breaker 1000 when the device 100 is mounted on the electrical circuit breaker 1000 and the handle 1100 is operated by the movement of the carriage 150. The first actuator 110 can move the carriage 150 in a first direction and the second actuator 120 can move the carriage 150 in a second direction, which is opposite to the first direction.

Figure 3A:
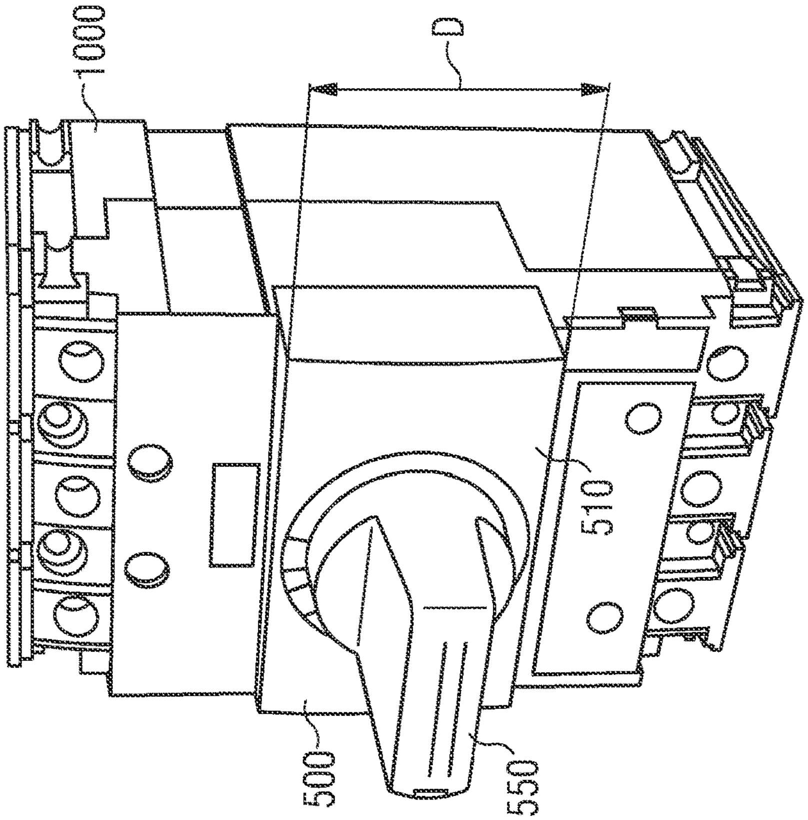
FIGS. 3A and 3B: show an electrical circuit breaker with the multi-function operator and operator knob according to the invention and an electrical circuit breaker with the multi-function operator according to the invention.

FIG. 3A illustrates a multi-function operator 500 according to the invention with a housing 510 and a device 100 according to the invention. The multi-function operator 500 is mounted on the electrical circuit breaker 1000 and the actuators 110; 120 of the device 100 can operate the handle 1100 of the electrical circuit breaker 1000. Due to the smaller design, the overall height D of the multi-function operator 500 can be configured such that it is limited within typical switchgear cabinet segments, for example 45 mm (millimeters). This would make it possible for no lateral motor operators to be required.

The multi-function operator 500 comprises an operator knob 550, the activation of which can set the actuators 110; 120 of the device 100 in motion. The operator knob 550 can for example be designed as a rotary handle operator knob or as a button. If the operator knob 550 is designed as a rotary handle operator knob, the rotational position of the operator knob 550 is used to decide whether the first actuator 110, the second actuator 120 or none of the actuators 110; 120 is heated.

Figure 3B:
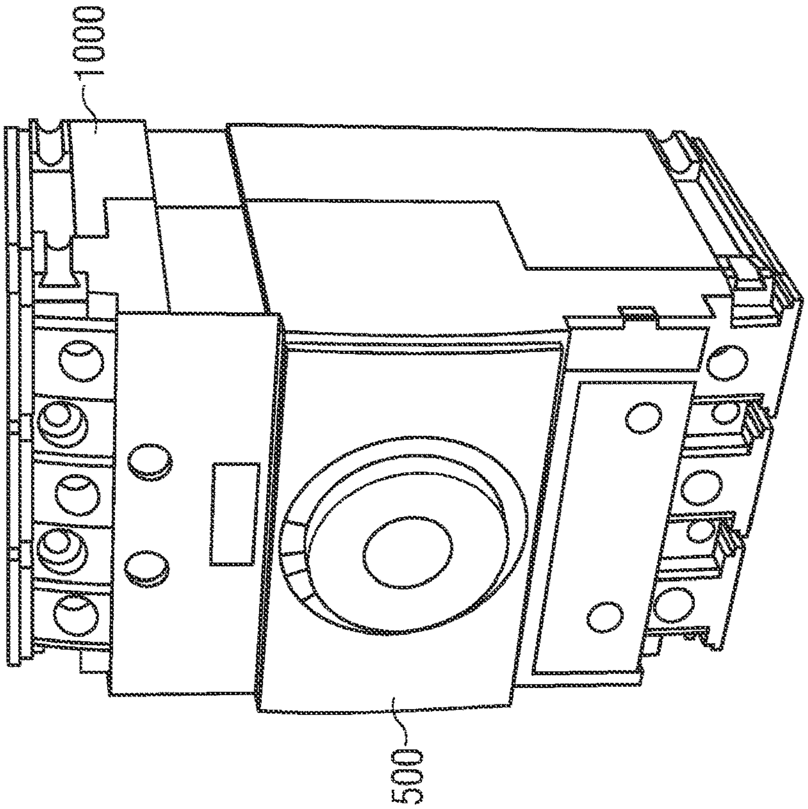

FIG. 3B illustrates the multi-function operator 500 according to the invention, which is mounted on the electrical circuit breaker 1000. In a configuration of this type, the multi-function operator 500 can for example be used as a motor operator which allows the switching of the handle 1100 from a distance.

Figure 4:
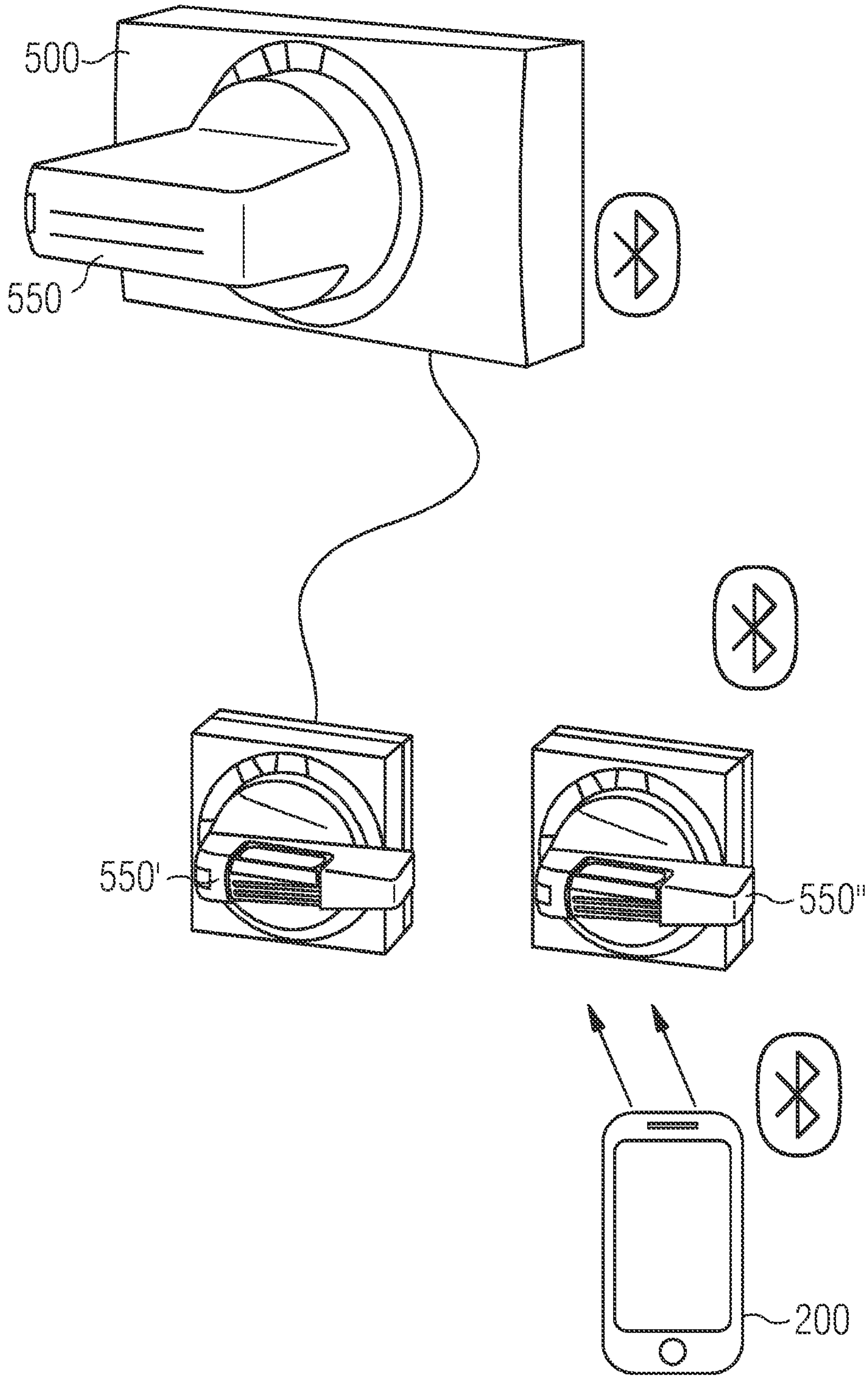
FIG. 4: shows the multi-function operator with operator knob according to the invention and further operator knobs and an external appliance.

FIG. 4 in turn illustrates the multi-function operator 500 with an operator knob 550. Further operator knobs 550' and 550" are also illustrated, which communicate with the multi-function operator 500 for switching the handle 1100.

The operator knob 550' is connected by means of an electrical connection, for example a cable, to the rest of the multi-function operator 500. The operator knob 550' can for example be mounted on a switchgear cabinet door or in a remote control room. Alternatively, a mechanical connection, for example via a Bowden cable, between the operator knob 550' and the multi-function operator 500 would be possible.

The operator knob 550' is wirelessly connected to the rest of the multi-function operator 500, for example by means of the Bluetooth protocol. Also, the operator knob 550" is not mounted on the housing 510 of the multi-function operator 500, but rather can for example be mounted on a switchgear cabinet, a switchgear cabinet door or in a remote control room.

FIG. 4 furthermore illustrates an external appliance 200, which can likewise interact with the multi-function operator 500 for switching the handle 1100 of the electrical circuit breaker 1000. This external appliance 200 can be connected to the multi-function operator 500 mechanically, electrically or wirelessly and set the actuators 110; 120 of the device 100 in motion. The external appliance 200 may for example be a smartphone, a tablet computer, a notebook or another computer, particularly in a remote control room.

The shape-memory alloys of the actuators 110; 120 can be configured such that when the multi-function operator 500 is mounted on the electrical circuit breaker 1000, the handle 1100 can be operated in less than 50 msec (milliseconds). Preferably, the handle 1100 is operated between 10 msec and 20 msec.

The device 100 according to the invention and the multi-function operator 500 according to the invention can realize large reserves of force and travel in a small space. Fault-prone designs, for example using a ratchet wheel, on which current motor operators and stored energy operators are based, can be eliminated by the multi-function operator according to the invention.

Furthermore, an electronic control may possibly be dispensed with. The multi-function operator 500 according to the invention is quieter than previous motor operators or stored energy operators. On the whole, the multi-function operator according to the invention can be realized in a very cost-effective construction, as substantially fewer mechanical, electromechanical and electronic parts are required than in typical motor operators, stored energy operators or rotary handle operators. The production costs and development support costs are lower due to the less expensive construction, which consists of fewer components, and the simpler manufacturing and mounting.

The invention claimed is:

1. A device for operating a handle of an electrical circuit breaker, the device comprising:
- a first actuator and a second actuator;
- with the device mounted on the electrical circuit breaker, said first actuator being configured to move the handle in a first direction and said second actuator being configured to move the handle in a second direction, which is opposite to the first direction;
- a carriage configured to enclose the handle of the electrical circuit breaker when the device is mounted on the electrical circuit breaker and to operate the handle by a movement of said carriage, and said first actuator being configured to move said carriage in the first direction and said second actuator being configured to move said carriage in the second direction opposite the first direction; and
- each of said first actuator and said second actuator being a shape-memory alloy actuator.

2. The device according to claim 1, wherein, when the device is mounted on the electrical circuit breaker, said first actuator is enabled to move the handle only in the first direction and said second actuator is enabled to move the handle only in the second direction, opposite the first direction.

3. The device according to claim 1, wherein said carriage is configured for movement along at least one guide.

4. A multi-function operator, comprising:
- a housing;
- a device for operating a handle of an electrical circuit breaker disposed in said housing, said device having:
  - a first actuator and a second actuator, each of said first actuator and said second actuator being a shape-memory alloy actuator, and
  - with the device mounted on the electrical circuit breaker, said first actuator being configured to move the handle in a first direction and said second actuator being configured to move the handle in a second direction, which is opposite to the first direction; and
- said housing being configured for mounting the multi-function operator to the electrical circuit breaker and, with the multi-function operator mounted to the electrical circuit breaker, the first and second actuators of the device are disposed to set the handle of the electrical circuit breaker in motion for switching the electrical circuit breaker; and
- at least one operator knob configured, upon an activation thereof, to set the actuators of said device in motion, and said at least one operator knob being connected to remaining elements of the multi-function operator by an electrical connection or a wireless connection.

5. The multi-function operator according to claim 4, wherein each of said shape-memory alloy actuators is configured, when the multi-function operator is mounted on the electrical circuit breaker, to operate the handle in less than 50 milliseconds.

6. The multi-function operator according to claim 5, wherein each of said shape-memory alloy actuators is configured to operate the handle within 10 msec to 20 milliseconds.

7. The multi-function operator according to claim 4, wherein said at least one operator knob is a rotary handle operator knob or a button.

8. The multi-function operator according to claim 4, configured to be operated by way of an external appliance that is connected to the multi-function operator mechanically, electrically, or wirelessly and that is enabled to set the first and second actuators of the device in motion.

9. The multi-function operator according to claim 8, wherein the external appliance is a device selected from the group consisting of a smartphone, a tablet computer, a notebook, and a computer.

10. The multi-function operator according to claim 8, wherein the external appliance is located in a remote control room.

* * * * *